United States Patent
Oshiumi et al.

(10) Patent No.: US 7,189,184 B2
(45) Date of Patent: Mar. 13, 2007

(54) CONTROL SYSTEM FOR CONTINUOUSLY VARIABLE TRANSMISSION OF VEHICLE

(75) Inventors: Yasuhiro Oshiumi, Gotenba (JP); Kunihiro Iwatsuki, Toyota (JP); Takayuki Amaya, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 215 days.

(21) Appl. No.: 11/050,718

(22) Filed: Feb. 7, 2005

(65) Prior Publication Data

US 2005/0181909 A1   Aug. 18, 2005

(30) Foreign Application Priority Data

Feb. 18, 2004   (JP)   ............... 2004-041756

(51) Int. Cl.
*F16H 61/662*   (2006.01)
(52) U.S. Cl. ......................... 477/46; 477/45
(58) Field of Classification Search .............. 477/44, 477/45, 46, 107
See application file for complete search history.

(56) References Cited

U.S. PATENT DOCUMENTS

| | | | |
|---|---|---|---|
| 5,656,921 A | 8/1997 | Farrall | |
| 6,155,954 A | 12/2000 | Itoyama et al. | |
| 6,460,398 B1 | 10/2002 | Stopp | |
| 6,634,982 B2 | 10/2003 | Miki et al. | |
| 6,813,551 B2* | 11/2004 | Taniguchi et al. | 701/59 |
| 6,974,009 B2* | 12/2005 | Hoshiya et al. | 192/3.63 |
| 2002/0173391 A1 | 11/2002 | Endo et al. | |
| 2002/0173895 A1 | 11/2002 | Ichiro et al. | |
| 2003/0150683 A1* | 8/2003 | Hoshiya et al. | 192/3.57 |
| 2004/0242370 A1* | 12/2004 | Iwatsuki et al. | 477/45 |

FOREIGN PATENT DOCUMENTS

| | | | |
|---|---|---|---|
| DE | 100 84 277 | | 3/2002 |
| EP | 1 333 198 A | | 8/2003 |
| EP | 1566578 | * | 8/2005 |
| JP | 2001-12593 | | 1/2001 |

* cited by examiner

*Primary Examiner*—Ha Ho
(74) *Attorney, Agent, or Firm*—Oblon, Spivak, McClelland, Maier & Neustadt, P.C.

(57) ABSTRACT

The control system comprises: an operating state changing mechanism for an operating state of the prime mover in response to a satisfaction of learning execution condition of the clamping pressure; a torque change suppressing mechanism for suppressing a change in a torque resulting from the change in the operating state of the prime mover; and a clamping pressure learning device for learning the clamping pressure in the operating state of the prime mover after the change, while the operating state of the prime mover is being changed and the change in the torque resulting from the change in the operating state of the prime mover is being suppressed by the torque change suppressing mechanism.

19 Claims, 11 Drawing Sheets

CONTROL SYSTEM FOR CONTINUOUSLY VARIABLE TRANSMISSION OF VEHICLE

BACKGROUND OF THE INVENTION

1. Field of the Invention

This invention relates to a control system for setting a clamping pressure of a continuously variable transmission which is mounted on a vehicle, neither too much nor too little, by learning the clamping pressure in every operating state of the vehicle or a prime mover, and by reflecting the learned result of in the control of the clamping pressure.

The disclosure of Japanese Patent Application No. 2004-041756 filed on Feb. 18, 2004 including specification, drawings and claims is incorporated herein by reference in its entirety.

2. Discussion of the Related Art

A belt type continuously variable transmission or a traction type continuously variable transmission transmits a torque by utilizing a frictional force between a belt and pulleys or a shearing force of traction oil between discs and rollers. Accordingly, a torque capacity of the continuously variable transmission of those kinds is set in accordance with the pressure acting on a portion where the transmission of the torque occurs.

The aforementioned pressure in the continuously variable transmission is called "clamping pressure". When this clamping pressure is raised, the torque capacity can be increased to avoid a slip. On the contrary, there arises a disadvantage that a power is consumed more than necessary for establishing a high pressure or that the efficiency of power transmission is degraded. Therefore, the clamping pressure or applying pressure is generally set as low as possible within a range of no unintentional slip.

In a vehicle carrying the continuously variable transmission, for example, the mileage can be improved by controlling the speed of an engine with the continuously variable transmission. In order not to deteriorate this advantage, therefore, the clamping pressure is controlled to a level as low as possible within a range of no slip so that the power transmission efficiency in the continuously variable transmission may be improved as high as possible. Theoretically, the demand clamping pressure of the continuously variable transmission can be determined by using a structural parameter, such as a friction coefficient or an angle to clamp the belt by pulleys, as a variable, and by using a parameter representing an operating state such as an input torque or a running radius of the belt, as a constant. However, the variable such as the input torque as well as the constant such as the friction coefficient are not constant due to the individual difference, the aging or the estimated error. Therefore, it is difficult to determine an accurate value of the clamping pressure in advance. For this reason, the clamping pressure corresponding to the pressure in which the slip starts occurring (i.e., the slip limit pressure) or to the actual input torque, is measured or learned on the basis of the actual operating state or operative condition of the continuously variable transmission, and the measured or learned result is reflected on subsequent control.

One example is disclosed in JP-A-2001-12593 which discloses a transmission provided with a pair of conical discs and a driving member. In this transmission, the contacting force between the conical discs to clamp the driving member is varied to determine the slip limit, and is adjusted so as not to exceed the slip limit, in case the force to be transmitted, the speed, the transmission ratio or combination of those is substantially constant.

In the invention disclosed in JP-A-2001-12593, the contacting force is lowered within a range of no slip by controlling the contacting force on the basis of the detected slip limit. A characteristic field, which relates to the speed, torque, the speed change ratio and temperature, and which indicates the contacting force necessary for a specific slip, is so stored as to adjust the contacting force to correspond to the stored characteristic field.

The clamping pressure in the continuously variable transmission or the aforementioned contacting force is the pressure to set the torque capacity to transmit the inputted torque neither too much nor too little. Therefore, the learning of the clamping pressure or the contacting force is carried out in response to the operating state such as the torque or the speed, and the learned value is reflected on the control of the clamping pressure, under the operating state identical or similar to the operating state where the learning is carried out. In the invention disclosed in JP-A-2001-12593, moreover, the slip limit is determined by changing the contacting force under the operating state where a predetermined condition is satisfied. Therefore, the slip limit or the clamping pressure of various kinds of operating state cannot be determined or learned over a wide range unless the operating state of the continuously variable transmission or the vehicle having the continuously variable transmission changes widely. In other words, according to invention disclosed in JP-A-2001-12593, detection of the slip limit or the learning of the clamping pressure may be restricted.

SUMMARY OF THE INVENTION

The present invention has been conceived noting the technical problems thus far described and its object is to provide a control system for a continuously variable transmission of a vehicle, which enables a learning of respective clamping pressures over a wide range of operating state.

According to the present invention, there is provided a control system for a continuously variable transmission of a vehicle, in which a clamping pressure of rotary members to clamp a transmission member is learned and set in every operating state of a prime mover connected to an input side of the continuously variable transmission having those rotary members and transmission member. In the control system of the invention: the operating state of the prime mover is changed according to a satisfaction of a learning execution condition of the clamping pressure; a change in a torque resulting from a change in the operating state of the prime mover is suppressed; and the clamping pressure in the operating state of the prime mover after the aforementioned changes is learned under the state where the operating state of the prime mover is being changed, and the change in a torque resulting from the change in the operating state of the prime mover is being suppressed.

The suppression of the change in the torque is carried out by suppressing a change in a torque inputted to the continuously variable transmission from the prime mover when the operating state of the prime mover is changed.

Otherwise, the suppression of the change in the torque is carried out by suppressing a change in a drive torque of the vehicle when the operating state of the prime mover is changed.

According to the invention, moreover, the operating state of the prime mover is changed by selecting a frequently-used operating state.

According to the invention, still moreover, the learning of the clamping pressure is carried out in response to a change in behavior of the continuously variable transmission resulting from lowering the clamping pressure, and the learning is inhibited in a less frequently-used operating state.

Also, according to the invention, a speed change ratio of the continuously variable transmission is controlled to suppress a change in speed of the prime mover, in case the operating state of the prime mover is changed and the change in the torque is suppressed.

According to the invention, moreover, the learning of the clamping pressure is a control to obtain a proportion or a difference between a calculated value and an estimated value of the torque as a learned value. In the learning, the torque of the prime mover corresponding to a lower limit clamping pressure is calculated on the basis of a lower limit pressure of the case in which the clamping pressure is lowered within a range of no slip of the transmission member such as the belt, and the torque of the prime mover in the changed operating state is estimated.

According to the invention, therefore: the torque capacity of the continuously variable transmission is set by the clamping pressure of the rotary members to clamp the transmission member; the clamping pressure is learned in every operating state of the of the prime mover connected to the input side of the continuously variable transmission; and the operating state of the prime mover is changed in case the learning condition is satisfied. An output torque changes as a result of the change in the operating state of the prime mover, however, the changes in the torques resulting from the change in the output torque are suppressed. Specifically, the change in the input torque of the continuously variable transmission and the change in the drive torque of the vehicle are suppressed. The learning of the clamping pressure is carried out in this situation. Accordingly, it is possible to learn the clamping pressure of the case in which the operating state of the vehicle is changed, and to enlarge a learning range of the clamping pressure even if the operating state of the vehicle as a whole does not change.

According to the invention, the change in the input torque to the continuously variable transmission is suppressed even when the operating state of the vehicle is changed. Therefore, the learning of the clamping pressure can be carried out without changing the input torque to the continuously variable transmission, in other words, with keeping the operating state of the continuously variable transmission or the output side therefrom. As a result, the learning range of the clamping pressure can be enlarged.

According to the invention, moreover, change of the entire drive torque of the vehicle is prevented or suppressed even if the operating state of the prime mover is changed. Therefore, the learning range of the clamping pressure can be carried out regardless of the actual operating state of the vehicle. As a result, the learning range of the clamping pressure can be enlarged.

According to the invention, still moreover, the clamping pressure of the prime mover in the frequently-used operating state is learned. Therefore, the opportunity to reflect the learned result, in other words, the opportunity to set the clamping pressure appropriate to the operating state is increased. This is advantageous to improve fuel consumption of the vehicle and durability of the continuously variable transmission.

According to the invention, still moreover, although the learning of the clamping pressure is carried out by lowering the clamping pressure, the learning of the clamping pressure is inhibited in the less frequently-used operating state. As a result, it is possible to prevent the continuously variable transmission from being predisposed to slip arising from the lowering of the clamping pressure.

According to the invention, furthermore, in case the change in the torque is suppressed in accordance with the change in the operating state of the prime mover, the speed of the prime mover is so controlled as to establish the speed in the operating state where the clamping pressure is to be learned, by controlling the speed change ratio of the continuously variable transmission. As a result, it is possible to prevent or suppress deviation of the operating state of the prime mover from the object range of the learning.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 6:
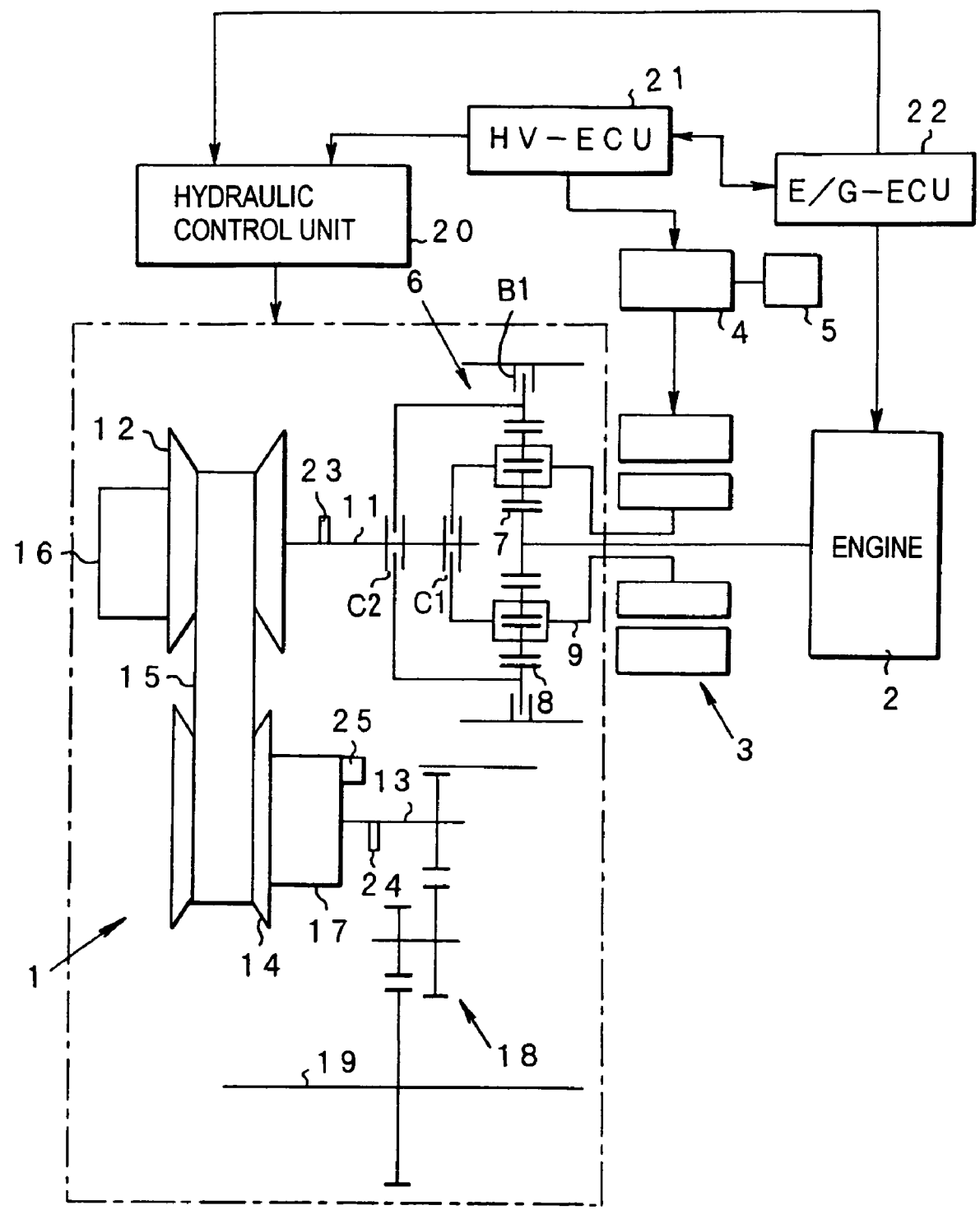
FIG. 6 is a diagram schematically showing one example of a transmission line including a continuously variable transmission to which the invention is applied.

This invention will be described in connection with its specific examples. First of all, here will be described a continuously variable transmission of a vehicle to which the invention is applied. The present invention is applied to: a belt-type continuously variable transmission, in which a belt functioning as a transmission member is applied to a pulley functioning as a rotary member and is clamped by sheaves of the pulley; or a toroidal type (traction type) continuously variable transmission, in which a power roller functioning as a transmission member is clamped by discs of input and output sides functioning as rotary members through oil (i.e., a traction oil), and in which a torque is transmitted by a shearing force of traction oil. One example of a drive mechanism including a belt type continuously variable transmission 1 is illustrated in FIG. 6. An engine 2 functioning as a prime mover, and a motor generator 3 having a power generating function for adding and reducing an additional torque to be applied to an output torque of the engine 2, and for controlling the speed of the engine 2, are arranged at the input side of the continuously variable transmission 1.

The engine 2 is, in short, a power unit for outputting a power by burning a fuel. Specifically, it is an internal combustion engine such as a gasoline engine, a diesel engine, or a natural gas engine. On the other hand, the motor generator 3 is a power unit supplied with electric current to act as an electric motor, and functioning as a generator as it rotated compulsory. A permanent magnet type synchronous electric motor may be adopted as the motor generator 3. Accordingly, an accumulator device such as a battery 5 is connected to the motor generator 3 through an inverter 4.

The engine 2 and the motor generator 3 are connected through a double-pinion type planetary gear mechanism 6. The double-pinion type planetary gear mechanism is a power switching mechanism for changing a mode of inputting a power to the continuously variable transmission 1, and the engine 2 is connected to its sun gear 7. A ring gear 8 or an internal gear is arranged concentrically with a sun gear 7. Between the sun gear 7 and ring gear 8, there are arranged pairs of pinion gears 8 meshing with each other. The pinion gears 8 are so held by a carrier 9 as to rotate thereon and to revolve around the carrier 9. The motor generator 3 is connected to the carrier 9. Moreover, there are provided a brake B1 for halting the rotation of the ring gear 8 selectively. An appropriate brake, such as a multi-disc brake or a band brake can be uses as the brake B1.

The continuously variable transmission 1 has the same construction as that of a belt type continuously variable transmission known in the related art. In the continuously variable transmission 1, a drive pulley (or a primary pulley) 12 is arranged on an input shaft (or a primary shaft) 11, and a driven pulley (or a secondary pulley) 14 is arranged on an output shaft (or a secondary shaft) 13. A belt 15 is applied to those pulleys 12 and 14. The pulleys 12 and 14 are constructed of a stationary sheave and a movable sheave; therefore, the groove widths and the running radii of the pulleys to which the belt 15 is applied are continuously variable. Also, actuators 16 and 17 for moving the driven pulleys in an axial direction are provided individually to the drive pulley 12 and the driven pulley 14.

Those actuators 16 and 17 move the movable sheaves in the axial direction by means of oil pressure. The groove width of the drive pulley 12 is changed by feeding or discharging the operating oil to the actuator 16 of the drive pulley 12 side, and the groove width of the driven pulley 14 is changed subsequently. As a result of this, the running radii of the belt 15 on the pulleys 12 and 14 are changed to carry out the speed change. On the other hand, the actuator 17 of the driven pulley 14 side establishes the clamping pressure of the pulleys 12 and 14 to clamp the belt 15, and the oil pressure corresponding to the input torque to the continuously variable transmission 1 is fed thereto. Additionally, the actuator 17 of the driven pulley 14 side is equipped with a spring (a spring not shown) for pushing a piston (a piston not shown) of the actuator 17 in the pressing direction by the operating oil. Therefore, a minimum clamping pressure is established even when the operating oil is not supplied.

In the continuously variable transmission 1, there are provided two clutches C1 and C2 for coupling an input shaft 11 and the planetary gear mechanism 6 selectively. Those clutches C1 and C2 can be exemplified by a multi-disc clutch which is operated by oil pressure. The clutch C1 is arranged between the input shaft 11 and the carrier 9, whereas the clutch C2 is arranged between the input shaft 11 and the ring gear 8. Namely, various running patterns can be set by arbitrarily applying or releasing those clutches C1, C2, and the brake B1. Here, an output shaft 13 is connected to an axle 19 through a gear pair 18.

For example, in case of applying the clutches C1 and C2, following running patterns are to be set: a forward running pattern in which a vehicle is run by transmitting the output torque of the engine 2 to the continuously variable transmission 1, or together with generating electric power by the motor generator 3; or a forward running pattern in which the torque of the motor generator 3 is added to the output torque of the engine 2. On the other hand, in case of applying the first clutch C1 only, the motor generator 3 is connected to the input shaft 11 directly so that a running pattern is set in which the vehicle is run only by the motor generator 3. In this case, additionally, both forward running and backward running are possible. Moreover, in case of applying the brake B1 and the first clutch C1, a backward running pattern is set in which the vehicle is run only by the engine 2.

There are provided a hydraulic control unit 20 for performing a control to apply/release the aforementioned brake B1 and clutches C1 and C2, a control of the speed change, and a control of the clamping pressure. This hydraulic control unit 20 is so operated by electric signals as to feed, discharge, and regulate the oil pressure. Command signals are inputted to the hydraulic control unit 20 from a hybrid electronic control unit (HV-ECU) 21 and an engine electronic control unit (E/G-ECU) 22. Here, the hybrid electronic control unit 21 mainly controls the motor generator 3, and exchanges the signals with an inverter 4. On the other hand, the engine electronic control unit 22 controls the fuel injection rate and the ignition timing of the engine 2, the opening degree of the throttle and so on.

Moreover, in order to detect data for those control units 20, 21 and 22 to carry out the controls, there are provided an input speed sensor 23 for detecting the speed of the input shaft 11, an output speed sensor 24 for detecting the speed of the output shaft 13, an oil pressure sensor 25 for detecting the oil pressure of the actuator 17 of the driven pulley 14 side and so on.

Since the torque capacity of the continuously variable transmission 1 corresponds to the clamping pressure, the clamping pressure is set in accordance with the input torque. The input torque is estimated on the basis of a load factor of the engine 2; however, an estimated error is unavoidable. Since the input torque is estimated in consideration of the error, the input torque is larger than the actual input torque. Accordingly, the clamping pressure is higher than the pressure corresponding to the actual input torque. For this reason, according to the invention, the clamping pressure is learned in every operating state and the learned result is reflected on the setting control of the clamping pressure. Control examples will be described hereinafter.

Figure 1:
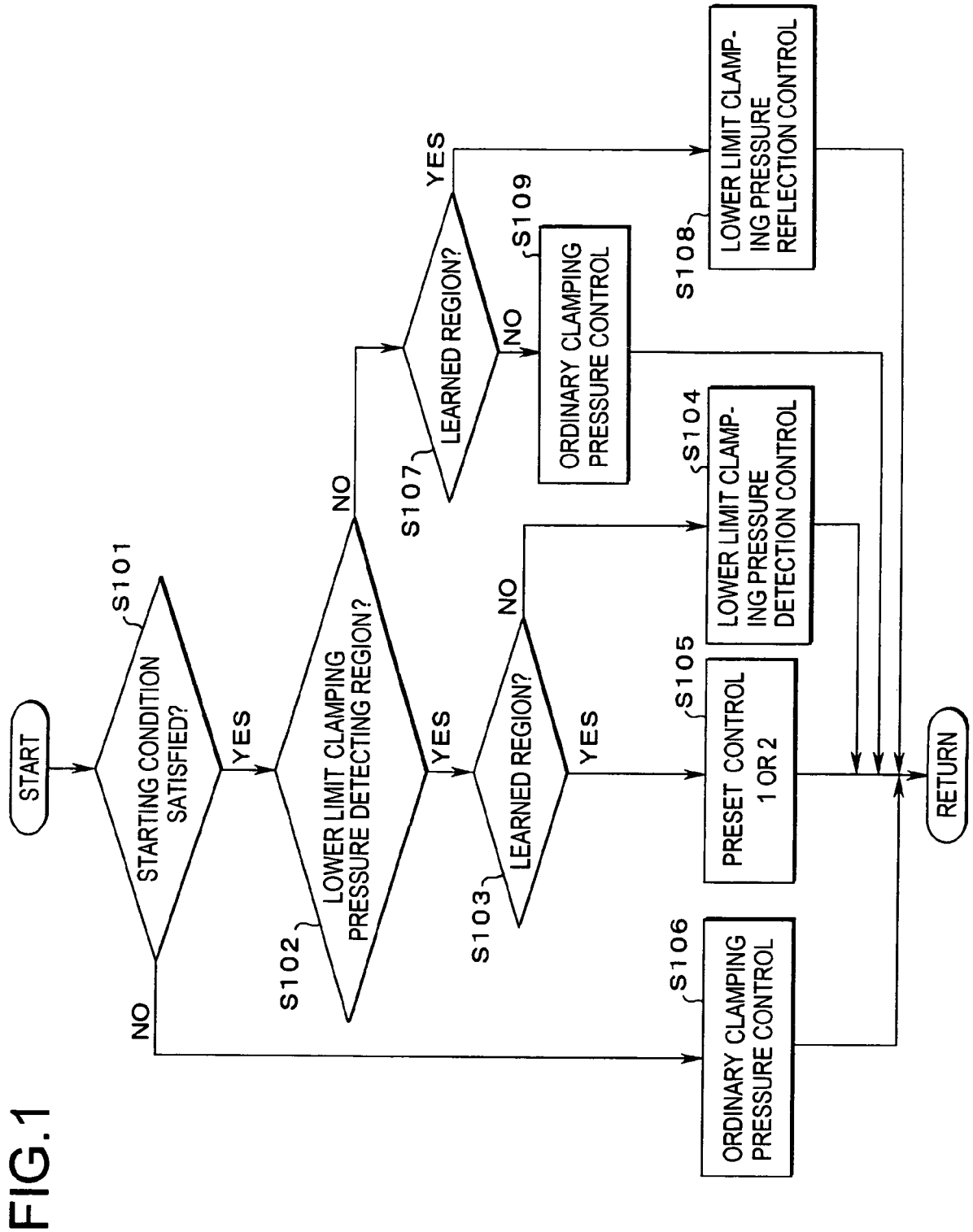
FIG. 1 is a flowchart for explaining a control example by a control system of this invention.

FIG. 1 is a flowchart for explaining one example of the control carried out by the control units 20, 21, and 22 of the invention. First of all, it is judged (at Step S101) whether or not a condition to start a control to lower the clamping pressure from the pressure in the ordinary control is satisfied. This condition is exemplified by: that the torque applied to the continuously variable transmission 1 is not excessively large; that the control signals and devices are normal; and so on. Specifically, the condition is exemplified by: that the change in the accelerator opening is within a predetermined range; that the road grade is within a predetermined range; that the road condition is good, i.e., the road is flat and paved; that each sensors function properly; that the controls of the continuously variable transmission 1 and the engine 2 can be carried out normally; and so on. In case all of those conditions are satisfied, the answer of Step S101 is YES.

If the control starting condition is satisfied so that the answer of Step S101 is YES, it is judged (at Step S102)

whether or not the operating state (or an operating range) is in a detecting region of lower limit clamping pressure. Here, the lower limit clamping pressure is the clamping pressure which is established mechanically when the oil pressure command value of the clamping pressure is lowered to minimum, and which does not cause a slip in the continuously variable transmission 1. Also, the operating state is the region represented by the input torque and the input speed of the continuously variable transmission 1. In case the vehicle is run by the power outputted from the engine 2, for example, this region can be represented by the engine speed and the load factor.

Figure 2:
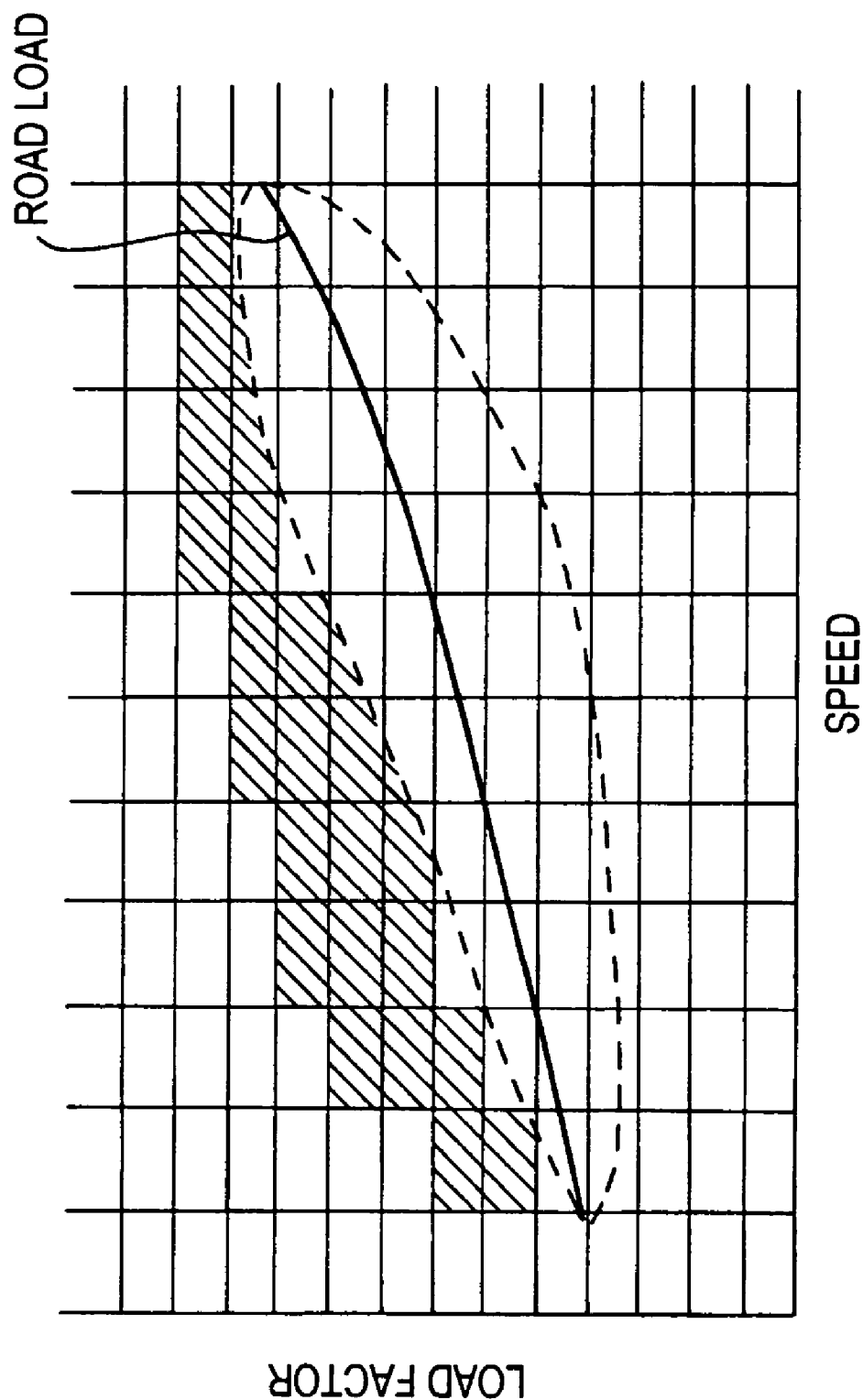
FIG. 2 is a map showing an example of a operating region.

FIG. 2 shows the operating region schematically. In FIG. 2, the engine speed and the load factor are individually partitioned at a suitable interval, and individual areas partitioned by the engine speed and the load factor is the operating region. A road load line is also illustrated in FIG. 2, and the area surrounded by a broken line corresponds to the lower limit clamping pressure detecting region. In this operating region, specifically, acceleration and deceleration are not carried out and a drive torque and a running resistance are balanced with each other. Therefore, the clamping pressure established by: a centrifugal oil pressure; an elastic force of the spring; and the minimum oil pressure structurally established by the hydraulic control unit 20; is higher than the clamping pressure corresponding to the input torque of the continuously variable transmission 1. Accordingly, no slippage will occur in the continuously variable transmission 1 even if the clamping pressure is lowered to the lower limit.

In case the operating state is in the lower limit clamping pressure detecting region so that the answer of Step S102 is YES, it is judged (at Step S103) whether or not the learning of the clamping pressure has been ended in the region to which the current operating state belongs, in other words, it is judged whether or not the operating region is the learned region. In case the operating state belongs to the region where the learning has not been carried out yet so that the answer of Step S103 is NO, a detection control of the lower limit clamping pressure is carried out (at Step S104). In this detection control, the command value of the oil pressure to set the clamping pressure is lowered while the conditions of Step S101 are satisfied, i.e., the running state of the vehicle is in the steady running state or in the quasi-steady running state, and the clamping pressure is detected in the state where the actual oil pressure reaches the pressure corresponding to the minimum command value while the slip of the continuously variable transmission 1 is not detected. As a result of obtaining the lower limit clamping pressure in such a manner, a learned value on the operating region can be obtained from a theoretical clamping pressure found by the input torque in the current operating state, and the detected lower limit clamping pressure. Consequently, this operating region becomes the learned region. For example, the learned value is a proportion between the input torque obtained from the lower limit clamping pressure by a back calculation, and the input torque estimated on the basis of the load factor or the like. Otherwise, the learned value may be a proportion or a difference between the theoretical clamping pressure and the lower limit clamping pressure.

On the contrary, in case the answer of Step S103 is YES, specifically, in case the current operating state is in the learned region, a preset control 1 or a preset control 2 is carried out (at Step S105). Although those preset controls 1 and 2 will be described later in detail, a main content thereof is a detection of the lower limit clamping pressure. According to those preset controls, the learning is carried out in variety of operating regions on the basis of the judgment as to whether or not the operating state is in the learned region.

On the other hand, in case the answer of Step S101 is NO, specifically, in case the starting condition of a learning control has not been satisfied, an ordinary clamping pressure control is carried out (at Step S106). The ordinary clamping pressure control is principally aimed at transmitting the torque in the continuously variable transmission 1 without causing the slip, and it is a control to supply a line pressure or an initial pressure of the hydraulic control unit 20 to the actuator 17 of the driven pulley 14 side. In other words, the ordinary clamping pressure control is a control to set the clamping pressure i.e., the sum of the theoretical clamping pressure determined on the basis of the input torque (the estimated value); a compensating pressure estimating a variation; a pressure for handling a rough road estimating a fluctuation of the torque acting on the continuously variable transmission 1 caused by undulation of the road, and so on. Therefore, the clamping pressure to be set is higher than the aforementioned lower limit pressure or the slip limit pressure.

In case the operating state is out of the lower limit clamping pressure detecting region so that the answer of Step S102 is NO, it is judged (at Step S107) whether or not the current operating state is in the learned region. This step is a judging step similar to the aforementioned Step S103. In case the learned value has already been obtained so that the answer of Step S107 is YES, a lower limit clamping pressure reflection control is carried out (at Step S108). As has been described above, the learned value is a value of so-called excess pressure, such as the compensating pressure added to the actual required clamping pressure, in consideration of the variations in control and the estimated error. The learned value is assessed on the basis of the actual operating state. At Step S108, therefore, the theoretical pressure, which is calculated from the input torque (or the estimated input torque) obtained on the basis of the current load factor and so on, is corrected according to the learned value, and the oil pressure is so controlled as to set the corrected oil pressure. As a result, the excess pressure estimating the estimated error or the like is eliminated from the clamping pressure. Therefore, the clamping pressure can be set low without causing the slip.

In case the learned value of the region to which the current operating state belongs has not been obtained yet so that the answer of Step S107 is NO, the ordinary control is carried out (at Step S109) as the aforementioned Step S106.

Figure 3:
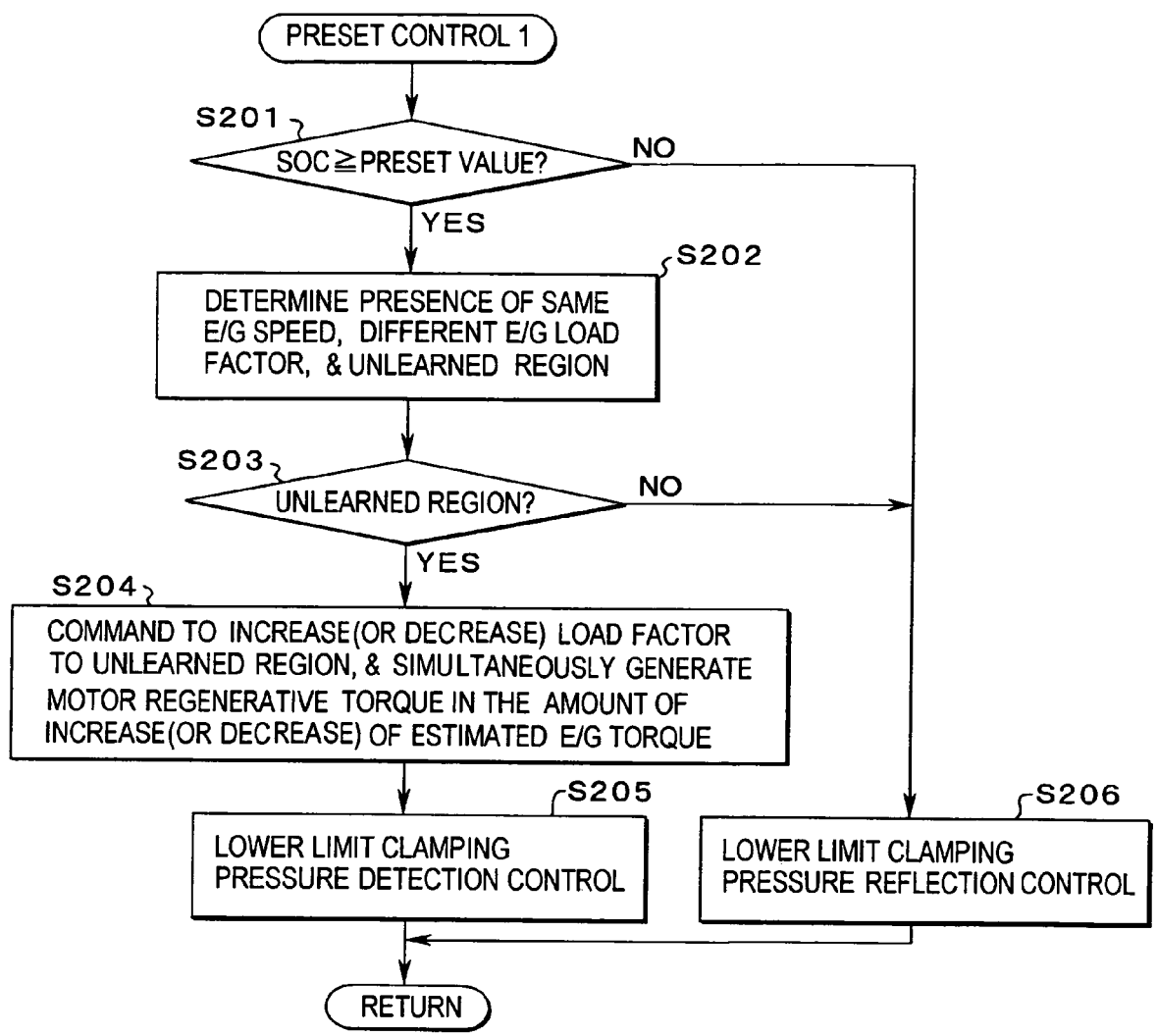
FIG. 3 is a flowchart for explaining an example of a preset control 1 included in the flowchart of FIG. 1.

Next, here will be described the preset control 1, which is carried out at the aforementioned Step S105. FIG. 3 is a flowchart for explaining a control example of the preset control 1. First of all, it is judged (at Step S201) whether or not a state of charge (SOC hereinafter) of a battery 5 is a preset value or smaller. This preset value is smaller than the value of a full charge state of the battery 5. In other words, at Step S201, it is judged whether or not the motor generator 3 can perform a regenerative action.

In case the answer of Step S201 is YES, it is determined (at Step S202) the presence of the operating region, wherein the speed is same as the current engine speed (or E/G speed) but the load factor is different from that of the current engine speed, and wherein the learned value thereof has not been obtained yet. This is explained with reference to FIG. 2. Specifically, this is a detection or judgment of the presence of the region which is the upper or lower region of the predetermined learned region in the lower limit clamping pressure detecting region surrounded by a broken line in FIG. 2, and in which the learned value has not been obtained yet. Then, it is determined (at Step S203) the presence of an unlearned region on the basis of the determination result of Step S202.

In case the unlearned region is present so that the answer of Step S203 is YES, a control to obtain the learned value of the unlearned region is carried out. First of all, a command to increase or decreases the load factor to the unlearned region is outputted, and then the regenerative torque or drive torque is outputted in the amount of increase or change in an estimated engine torque (or an estimated E/G torque) resulting from the change in the load factor (at Step S204). Specifically, a control to suppress the change in the output torque (i.e., the input torque to the continuously variable transmission 1) resulting from the change in the operating state of the engine 2 by the motor generator 3 is carried out. Therefore, in principle, no change come out with the input torque to the continuously variable transmission 1.

In this situation, a detection control of the lower limit clamping pressure is carried out (at Step S205). This is a control similar to that at aforementioned Step S104, and this is a control to lower the clamping pressure to the lower limit, by reducing the oil pressure command value gradually with a preset gradient to the minimum value which is determined structurally and keeping the reduced command value for preset time period, or by reducing the oil pressure command value gradually to the minimum after reducing it stepwise and keeping the reduced command value for preset time period. As a result of this, the current clamping pressure is detected. The learned value is obtained by making use of the lower limit clamping pressure thus obtained.

Here will be explained one example of the calculation of the learned value. The clamping pressure Psccal is determined as follows:

$$Psccal = (Tin \cdot \cos \theta)/2 \cdot \mu \cdot Aout \cdot Rin.$$

Here, the term $\theta$ designates a clamping angle of the pulleys 12 and 14 to clamp the belt 15, $\mu$ is a friction coefficient (an estimated value), the term Aout designates a pressure receiving area of the piston of the actuator 17 of the driven pulley 14 side, and the term Rin designates the running radius of the belt 15 on the drive pulley 12. In addition, the input torque Tin is a sum of the engine torque Te plus the torque Tm of the motor generator 3. Accordingly, this calculation is expressed by the following formula:

$$Tin = Te + Tm.$$

The clamping pressure is a sum of actual oil pressure Pd of the actuator 17 of the driven pulley 14 side plus pressure Psch established by a mechanical factor, such as centrifugal oil pressure, elastic force of a spring and so on. Accordingly, the actual oil pressure Pd is expressed by the following formula using the aforementioned clamping pressure Psccal corresponding to the input pressure. i.e.,:

$$Pd = Psccal - Psch.$$

The engine torque Te can be solved using those formulas, and it is expressed as the following formula:

$$Te = \{(Pd + Psch)(2\mu \cdot Aout \cdot Rin)/\cos \theta\} - Tm.$$

The actual oil pressure Pd in the formula is detected by the oil pressure sensor 25 as the pressure set by the command value of the lower limit clamping pressure, and the torque Tm of the motor generator 3 is obtained from the data such as the current value of the motor generator 3. Another parameters are determined by mechanically or structurally. Accordingly, the engine torque corresponding to the lower limit clamping pressure is calculated by the aforementioned formulas.

On the other hand, the estimated engine torque estimated by varying the load factor to the unlearned region can be obtained in advance as a characteristic data of the engine 2, and the regenerative torque Tm of the motor generator 3 or the drive torque Tm, which is synchronized with the change in the load factor, can be obtained easily from the control data. Therefore, an estimated engine torque corresponding value (i.e., the estimated input torque) Tepre, which is estimated after varying the load factor, can be obtained easily from the estimated torque obtained from the load factor of the engine 2 or the like, and the torque Tm of the motor generator 3.

Accordingly, a learned value a of the unlearned region can be obtained as a proportion between those torques, i.e.:

$$\alpha = Te/Tepre.$$

Namely, this learned value a corresponds to the engine torque or a correction coefficient of the clamping pressure (or theoretical clamping pressure) corresponding to the engine torque.

In consequence of thus obtaining the learned value a, the unlearned region is turned into the learned region. Here, in case the answer of aforementioned Step S201 is NO, and in case the operating state is in the learned region so that the answer of Step S203 is NO, a control to reflect the lower limit clamping pressure on the setting of the clamping pressure is carried out. In the example of aforementioned learned value α, the input torque is obtained by multiplying the estimated engine torque obtained from the load factor of the engine 2 or the like by the learned value α, and the clamping pressure is obtained on the basis of the calculated input torque. As a result of this, the clamping pressure corresponding to the excess pressure (or some percentage of the excess pressure) included in the estimated engine torque is eliminated. Therefore, it is possible to optimize the clamping pressure.

Figure 4:
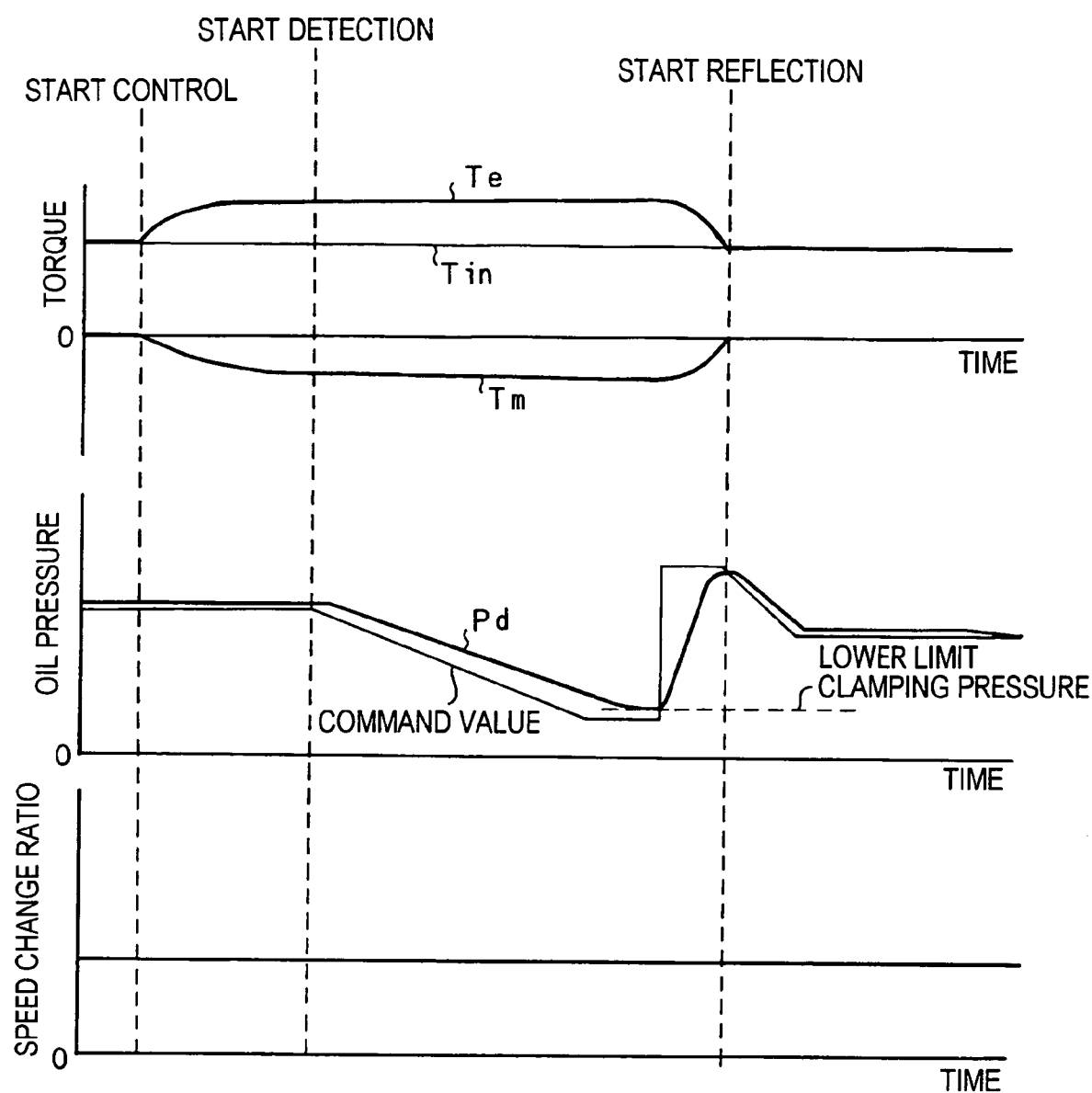
FIG. 4 is a time chart corresponding to control examples shown in FIGS. 1, 3 and 5.

FIG. 4 schematically shows changes in the torques, the oil pressure, and the speed change rate, of the case in which the aforementioned control is carried out. The engine torque Te increases as a result of the commencement of the control. However, the regenerative torque Tm of the motor generator 3 is generated in accordance with the increase in the engine torque Te on the other hand. The input torque to the continuously variable transmission 1 is thereby kept substantially constant. At the same time, the oil pressure command value is reduced gradually so that the actual oil pressure Pd is lowered gradually to the lower limit clamping pressure. Besides, the speed change rate is kept at constant value. Accordingly, the running radius Rin of the belt 15 on the drive pulley will not be varied.

Soon after the clamping pressure reaches the lower limit, the oil pressure command value is increased stepwise to the value larger than the initial value, and then, the clamping pressure control (i.e., the reflection control) making use of the learned value is carried out. As a result, the clamping pressure is set lower than that in the ordinary control.

According to the aforementioned control, the learning is carried out under the condition where the input torque to the continuously variable transmission 1 is kept constant without change, by varying the engine load factor from the operating state wherein no slip is caused even when the clamping pressure is lowered to the lower limit, and by offsetting the change in the engine torque resulting from the change in the engine load factor by the motor generator 3. Therefore, it is possible to obtain the learned value of the unlearned region without changing the running state of the vehicle and the input torque to the continuously variable transmission 1. Moreover, the clamping pressure can be optimized by making use of the learned value in case the operating state enters into the unlearned region. For this reason, it is possible to carry out the learning in a wide range of operating region, without waiting the change in the operating state of the vehicle.

Figure 5:
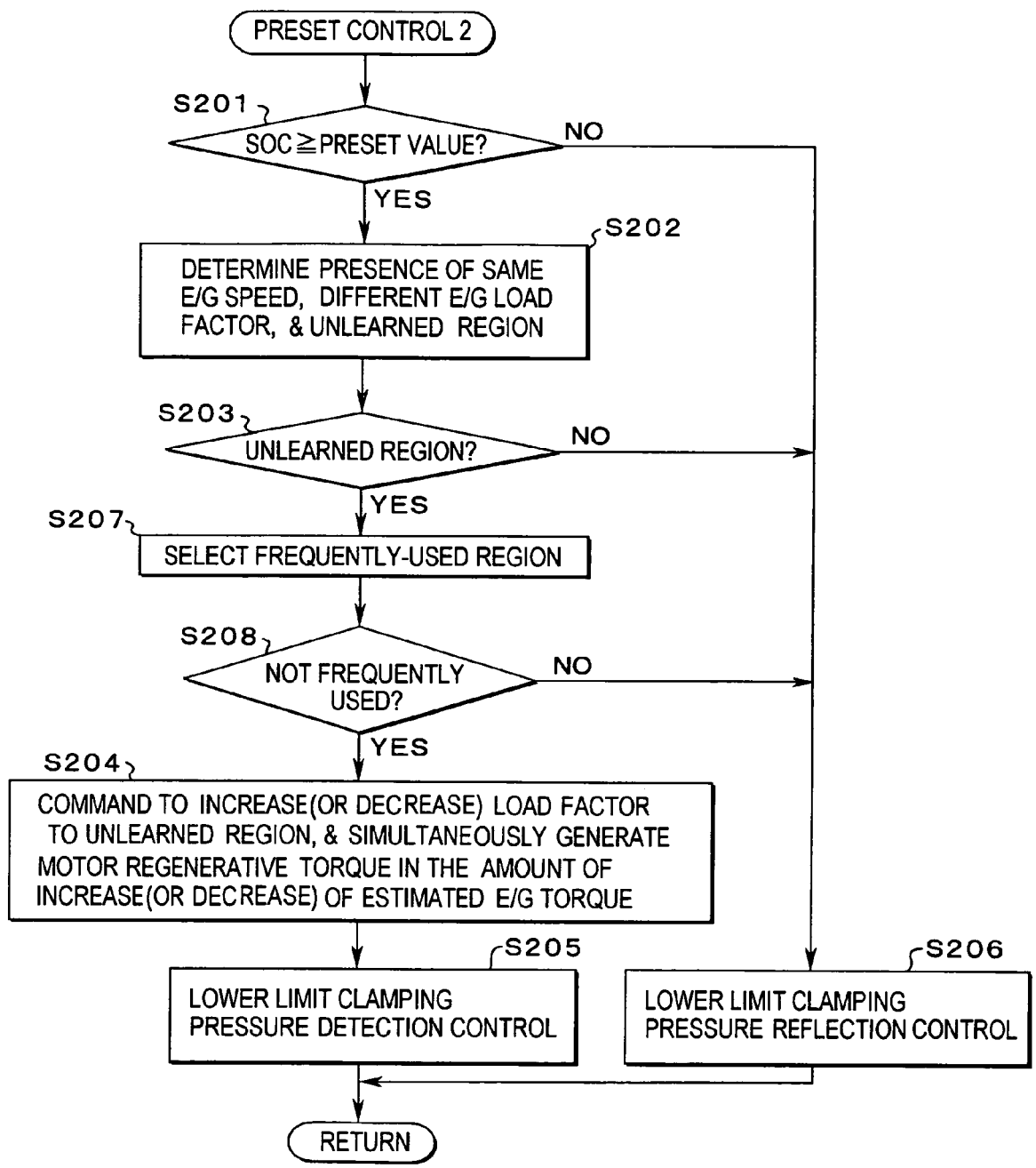
FIG. 5 is a flowchart for explaining an example of a preset control 2 included in the flowchart of FIG. 1.

According to the control system of the invention, the learning of the operating region, to which the operating state different from the current operating state of the engine 2 in the actual running belongs, is carried out by changing the operating state of the engine 2. This enables to carry out the learning in a wide range of operating region, however, on the other hand, the learning is carried out also in an operating region which is scarcely used in the actual running. Therefore, in order to avoid carrying out such a useless learning, execution and inexecution of the learning may be determined by assessing an operation frequency. An example is shown in FIG. 5. Here, in the control example shown in FIG. 5, a step of assessing or determining the operation frequency is added to the control example in FIG. 3. Therefore, further description of the common steps with the control example shown in FIG. 3 will be omitted by allotting common reference numerals to FIG. 5.

In FIG. 5, in case an operating region, in which the engine speed is identical to that in the learned region and the load factor is different from that in the learned region, is an unlearned region so that the answer of Step S203 is YES, a frequency in the use of the operating state which belongs to the unlearned region is assessed (at Step S207). With respect to a running pattern of the vehicle, in a typical running pattern, for example, the vehicle is accelerated, then runs at a constant speed, and decelerated by a brake. This means opportunity for using a strong engine braking is not so frequent. Concerning the operating range of the engine 2, therefore, it is conceivable that the operation frequency of the shaded area in FIG. 2 is frequent. For this reason, the assessment of aforementioned step S207 may also be carried out with reference to the data of such frequently used operating region, by storing the frequently used operating region in advance. Aside from this, or in addition to this, the assessment of aforementioned step S207 may also be carried out with reference to the data of classified operation frequency of individual operating regions, by counting the number of use of each operating region in the actual running.

Then, subsequent to assessing the operation frequency of unlearned region at aforementioned step S207, it is judged whether or not the unlearned region is used frequently (at Step S208). In case the answer of Step S208 is NO, specifically, the operation frequency of unlearned region is moderate or high, the routine advances to aforementioned Steps S204 and 205 sequentially, and the learning of the clamping pressure is carried out. On the contrary, in case the operation frequency of the unlearned region is low and the answer of Step S208 is YES, the current operating region belongs to the learned region (ref. Step S103) so that the lower limit clamping pressure reflection control is carried out in the current operating region (at Step S206). Specifically, the learning of the less frequently used operating region is inhibited.

In consequence of execution of the control shown in FIG. 5, therefore, the number of execution of the learning control including the operation for lowering the clamping pressure is decreased. As a result of this, possibility or opportunity of the slippage resulting from lowering of the clamping pressure can be reduced in the continuously variable transmission 1.

Additionally, in the aforementioned control in FIGS. 1, 3 and 5, the learning is carried out by lowering the input torque to the continuously variable transmission 1 to the lower limit clamping pressure detecting region in which the possibility of the slip is little even if the oil pressure command value is lowered to the minimum. Alternatively, the learning of the clamping pressure in the unlearned region may be carried out by lowering, in the operating region where the slip may occur, the clamping pressure until the slip start occurring thereby to learn the slip limit clamping pressure, and by controlling the output torque from the engine 2 by the motor generator 3 to the input torque in the learned region.

In the control example thus far described, the input torque to the continuously variable transmission 1 is not varied. However, according to the invention, the learning of the clamping pressure may be carried out by changing the load factor of the engine 2 and keeping the entire drive torque of the vehicle substantially constant. This enables to set the clamping pressure with correcting not only the estimated error of the input torque but also the estimated error of the friction coefficient. The control example will be described hereinafter.

Figure 7:
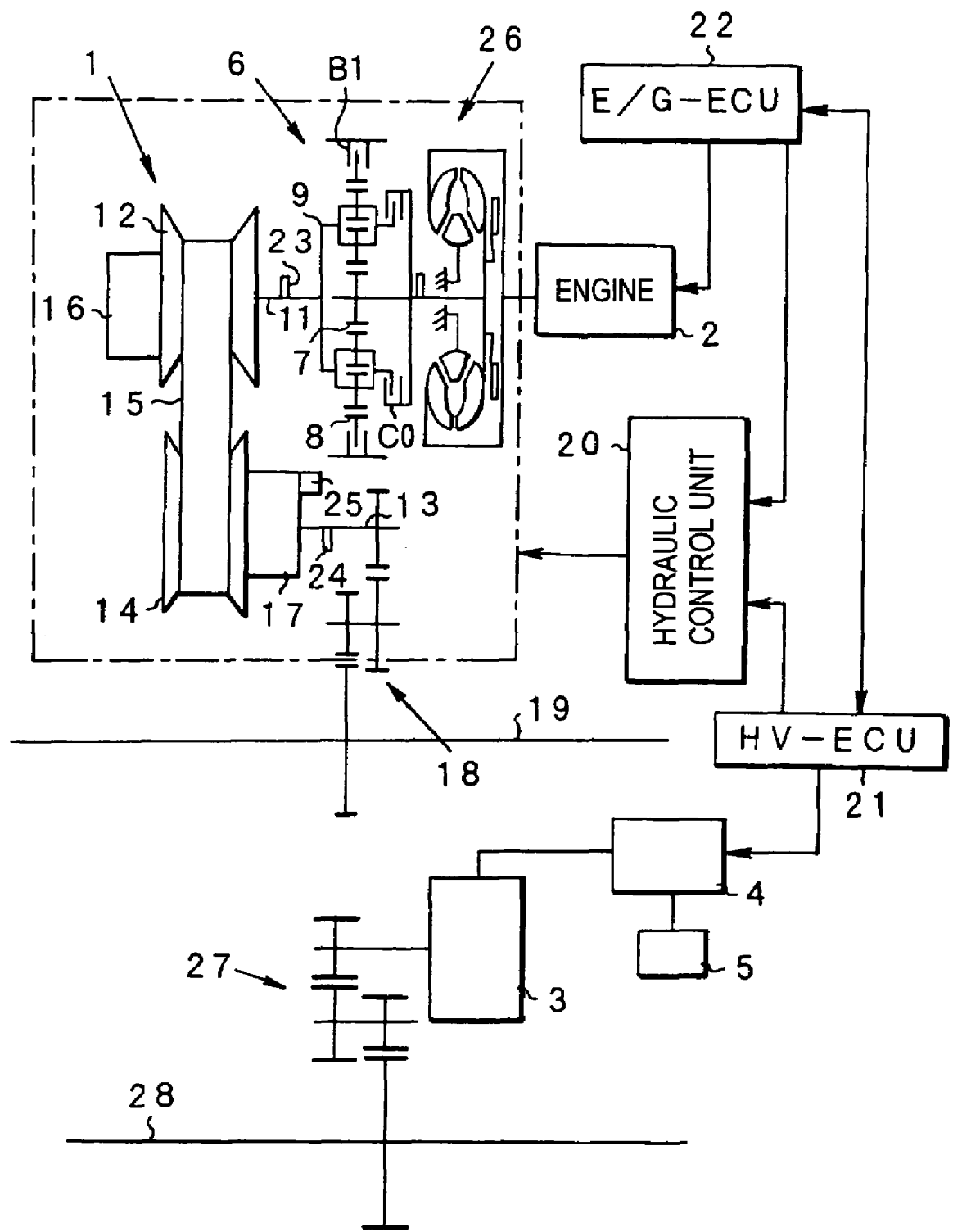
FIG. 7 is a diagram schematically showing a power train of another vehicle to which the invention is applied.

FIG. 7 shows a power train of a four wheel drive hybrid vehicle schematically. In this construction, the aforementioned planetary gear mechanism 6 is provided as a forward/backward switching mechanism. Specifically, the sun gear 7 and the planetary gear mechanism 6 connected through the torque converter 26 having a lockup clutch. Also, there is provided a lockup clutch Co for connecting the sun gear 7 and the carrier 9 selectively. Moreover, the carrier 9 and the input shaft 11 of the continuously variable transmission 1 are connected with each other. Additionally, the torque is outputted from the output shaft 13 of the continuously variable transmission 1 to a front axle 19. On the other hand, the motor generator 3 is positioned on a rear wheel side, and connected to a rear axle 28. The remaining construction is similar to that in FIG. 6, so further description will be omitted by allotting common reference numerals to FIG. 7.

Figure 8:
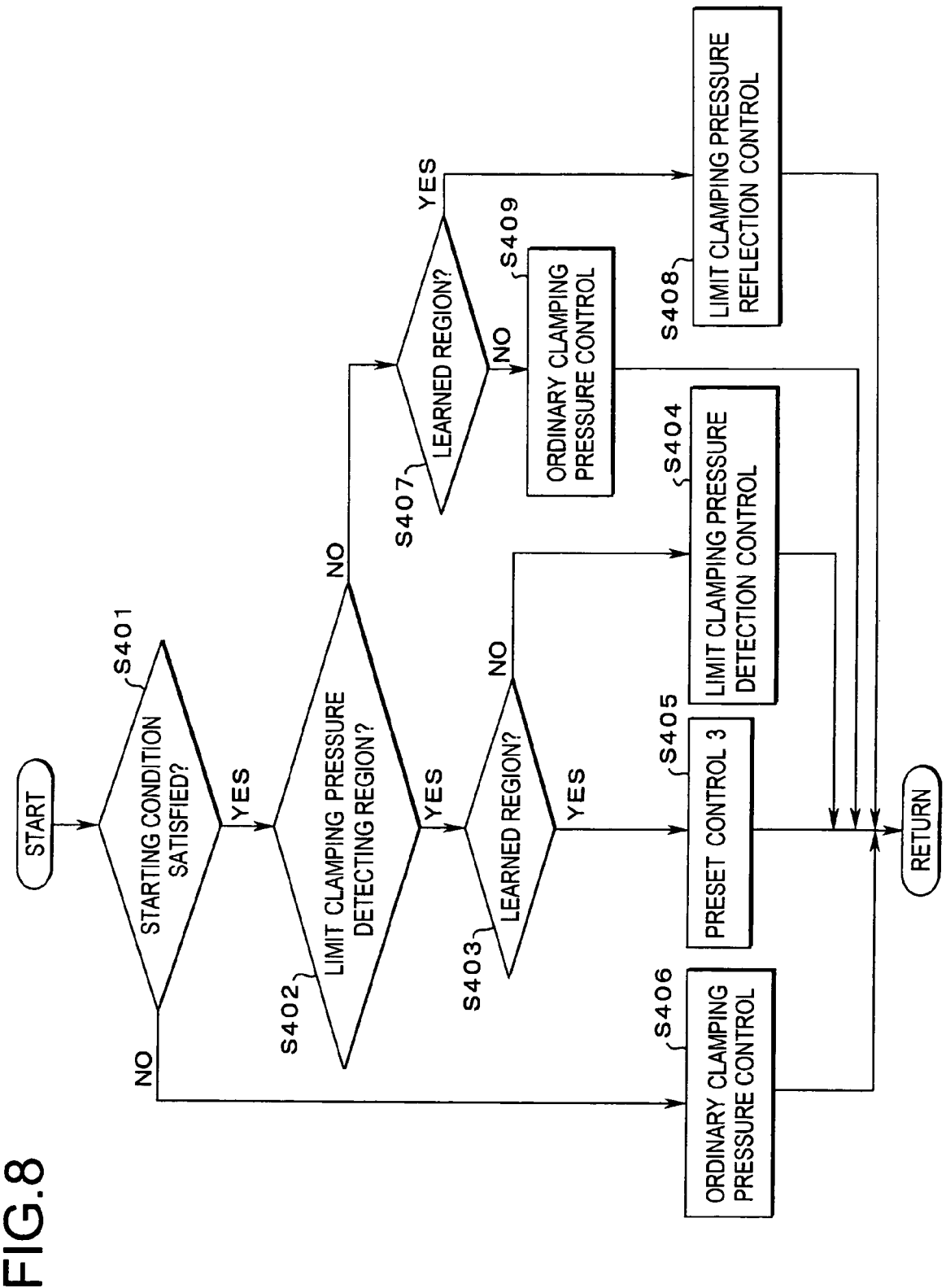
FIG. 8 is a flowchart for explaining a control example by a control system of this invention aimed at the vehicle illustrated in FIG. 7.

Here will be described an control example of the clamping pressure applied to the four wheel drive vehicle with reference to FIGS. 8 to 11. In FIG. 8, first of all, it is judged (at Step S401) whether or not the control starting condition is satisfied. This judgment is similar to Step S101 of the aforementioned Step S101. In case the answer of Step S401 is YES, it is judged (at Step S402) whether or not the operating state of the engine 2 is in a detecting region of a limit clamping pressure. Here, the limit clamping pressure is a clamping pressure in which an excessive slip (i.e., a macro slip) starts occurring in the continuously variable transmission 1, or a clamping pressure of just before the macro slip occurs. Accordingly, the region of the limit clamping pressure is out of the shaded area of FIG. 2. In addition, it is also possible to detect the aforementioned lower limit clamping pressure instead of the limit clamping pressure. In this case, the flowchart of the control shown in FIG. 8 is identical to that in FIG. 1.

In case the answer of Step S402 is YES, it is judged (at Step S403) whether or not the learned value has already been obtained in the region to which the current operating state belongs. This judgment is similar to that made at the aforementioned Step S103. In case the answer of Step S403 is NO, a detection control of the limit clamping pressure is carried out (at Step S404). Specifically, an occurrence of the slip and the clamping pressure at the time of occurrence are detected by lowering the oil pressure command value gradually while setting the clamping pressure in the ordinary control, and monitoring the speed change ratio and the speed changing rate in the process of lowering. Additionally, the lower limit clamping pressure is detected instead of the slip limit clamping pressure, if the current operating state is in the a detecting region of the lower limit clamping pressure.

On the contrary, in case the answer of Step S403 is YES, an after-mentioned preset control 3 is carried out (at Step S405).

In case the answer of Step S401 is NO, the condition to lower the clamping pressure is not satisfied, therefore, the ordinary clamping pressure control is carried out (at Step S406). This control is similar to that carried out at aforementioned Step S106 in FIG. 1. Moreover, in case the answer of Step S402 is NO, it is judged (at Step S407) whether or not the current operating state is in the learned region. If the current operating state is in the learned region, a clamping pressure control to reflect the limit clamping pressure based on the learned value is carried out (at Step S408). On the contrary, in case the answer of Step S407 is NO, the ordinary clamping pressure control is carried out (at Step S409).

Figure 9:
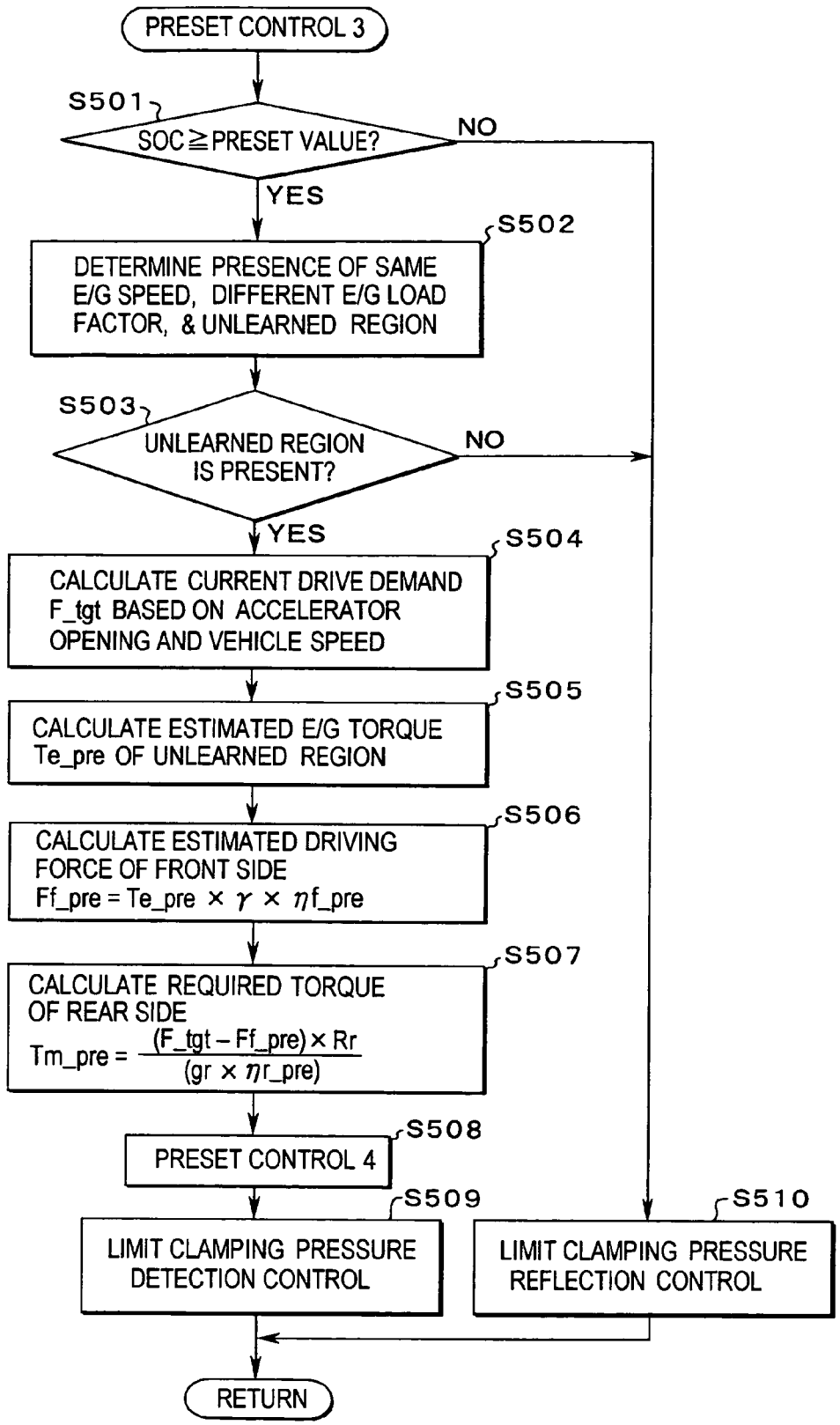
FIG. 9 is a flowchart for explaining an example of a preset control 3 included in the flowchart of FIG. 8.
Figure 10:
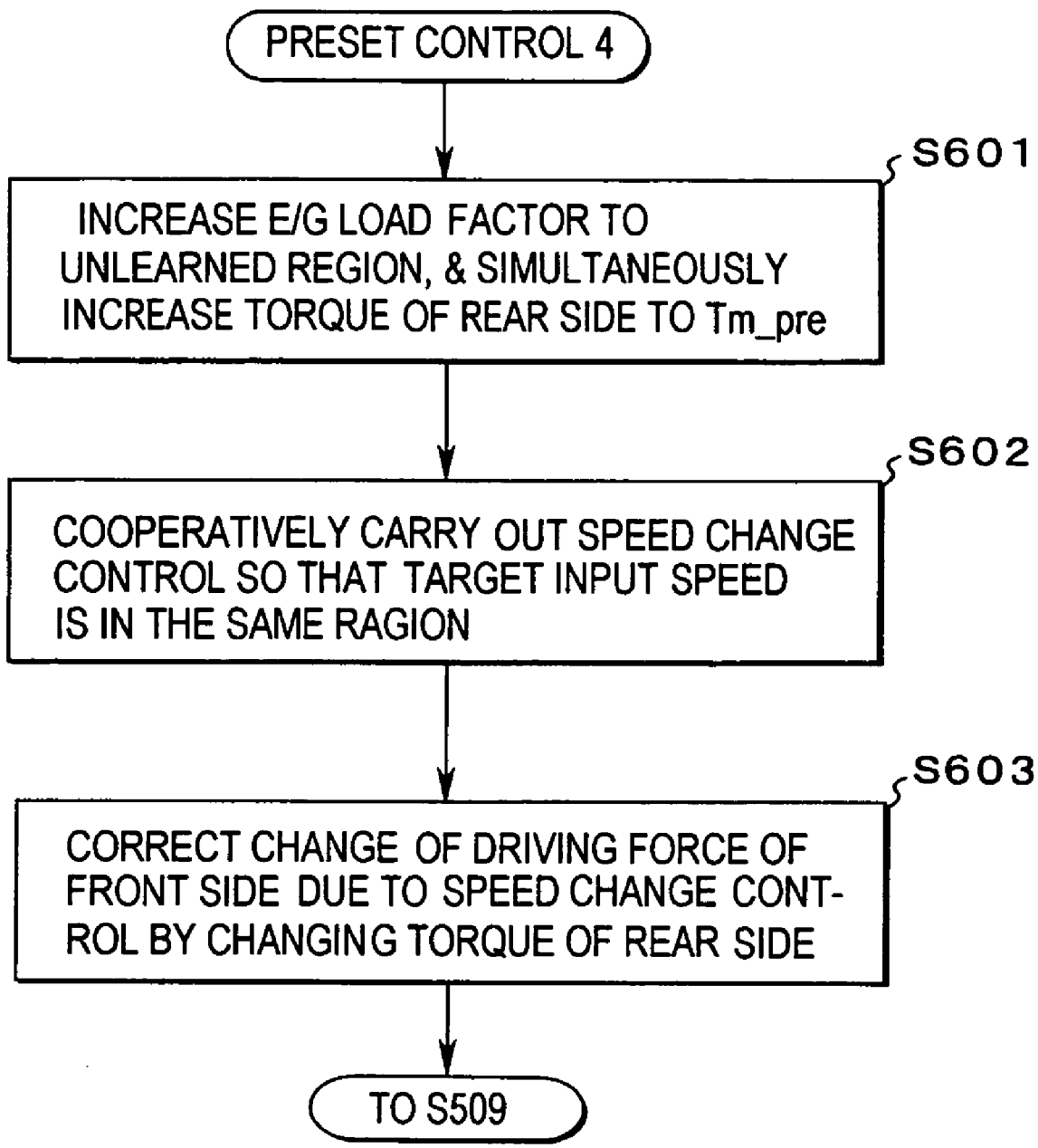
FIG. 10 is a flowchart for explaining an example of a preset control 4 included in the flowchart of FIG. 9.

Next, the preset control 3 at Step S405 will be described with reference to FIGS. 9 and 10. The motor generator 3 is driven or operated to perform a regenerative action also in the preset control 3. Therefore, it is judged (at Step S501) whether or not the state of the battery 5 to enable to perform the regenerative action, i.e., SOC is a preset value or smaller. This judgment is similar to that made at the aforementioned Step S201. In case the answer of Step S501 is YES, it is determined (at Step S502) the presence of the unlearned region, wherein the engine speed is identical but the load factor is different, and then, the presence of the unlearned operating region is judged (at Step S503). Those controls as Steps S502 and S503 are similar to Steps S202 and S203 shown in FIG. 3.

In case the unlearned region is present so that the answer of Step S503 is YES, a current drive demand F_tgt is calculated on the basis of a current accelerator opening and a vehicle speed. This calculation can be made as known in the art, e.g., by making use of mapped value, or in accordance with an operational expression. Then, an estimated engine torque Te_pre in the subject range is calculated (at Step S505). As has been described already, the operating region is determined by the load factor and the speed, so that the estimated engine torque Te_pre can be calculated on the basis of those data.

In the power train shown in FIG. 7, the output torque of the engine 2 is transmitted to the front axle 19. Therefore, an estimated drive demand Ff pre is calculated (at Step S506) using the following formula:

$$Ff\_pre = Te\_pre \cdot \gamma \cdot \eta f\_pre.$$

Here, the term $\gamma$ designates a speed change ratio of the front side, and the term $\eta f\_pre$ designates a power transmission efficiency of the front side.

Moreover, a torque Tm_pre of the rear wheel side (i.e, the rear side), which is required to keep or not to vary the entire driving force (or the drive torque) of the vehicle, is calculated (at Step S507) using the following formula:

$$Tm\_pre = (F\_tgt \cdot Ff\_pre) \cdot Rr/(gr \cdot \eta f\_pre).$$

Here, the term Rr designates an effective radius of a rear wheel, the term gr designates a speed change ratio of the rear side, and the term $\eta$ f_pre designates a power transmission efficiency of the rear side.

Figure 11:
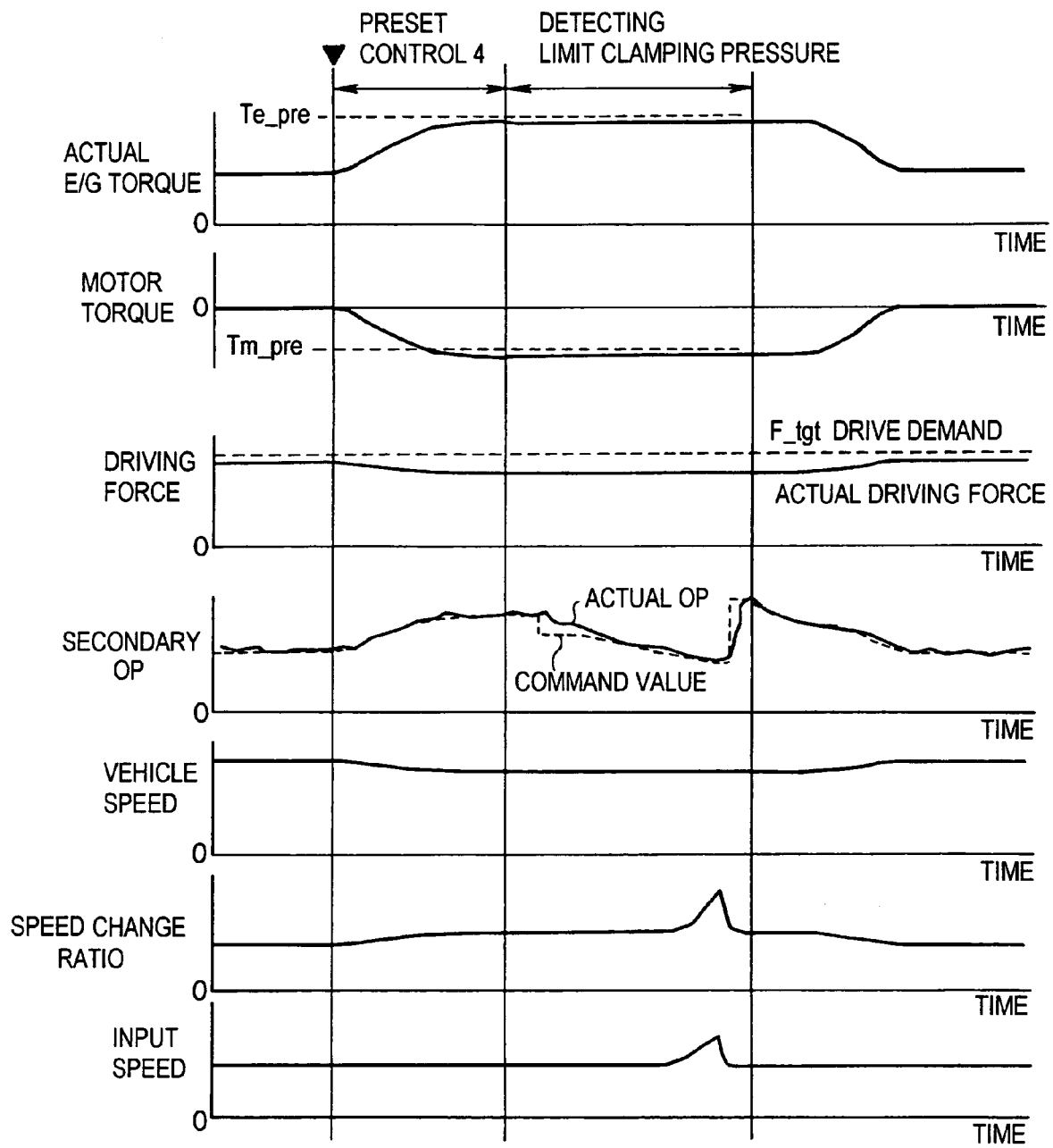
FIG. 11 is a time chart corresponding to control examples in shown FIGS. 8 to 10.

At the subsequent Step S508, a preset control 4 for changing the operating region of the engine 2 while keeping the driving force is carried out on the basis of those calculated data. A control example is shown in FIG. 10 and a corresponding time chart is shown in FIG. 11. In FIG. 10, the load factor of the engine 2 is changed to the unlearned region, and at the same time, the torque of the rear side is changed to the Tm_pre obtained at Step S507 (at Step S601). This is exemplified by an increase of the engine torque and a regeneration performed by the motor generator 3. Those are shown in FIG. 11.

In this case, if the estimated engine torque Te_pre is lower than the actual engine torque, a reduce amount of the torque of the motor generator 3 may be significant. As a result, a reduction in the driving force of the vehicle may be reduced and the vehicle speed may also be lowered. Moreover, if the vehicle speed drops, the engine speed is lowered so that the operating region is changed. In order to avoid this kind of situation, therefore, the engine speed (i.e., the input speed to the continuously variable transmission 1) is kept at constant speed cooperatively with the speed change control (i.e., a downshifting command) of the continuously variable transmission 1 (at Step S602). Additionally, since the torque applied to the continuously variable transmission 1 is increased during the process, an oil pressure (i.e., a secondary oil pressure) fed to the actuator 17 of the driven pulley 14 side to set the clamping pressure is increased.

Moreover, the driving force of the front side is changed in consequence of the aforementioned speed change control (i.e., the downshifting command). Therefore, the torque of the rear side is controlled by the motor generator 3 (at Step S603), in order to compensate the change in the driving force of the front side. As a result of this, the operating state of the engine 2, i.e., the input torque to the continuously variable transmission 1 is changed while keeping the entire driving force of the vehicle with almost no change. The operating state of the engine 2 thus set is in the unlearned region, therefore, a detection control of the limit clamping pressure is carried out (at Step S509).

A situation is shown schematically in FIG. 11. A command value of the secondary oil pressure is reduced stepwise as indicated by a broken line, and then reduced gradually with a predetermined gradient. The actual oil pressure is lowered gradually in response to the reduction in the command value. In the process, when the slip occurs in the continuously variable transmission 1, the speed change ratio is increased in consequence of the increase of the input speed. Accordingly, the slip in the continuously variable transmission 1 is detected in such change in behavior, and the oil pressure at the starting time of the slip is detected as the limit clamping pressure. Here, as shown in FIG. 11, the secondary oil pressure is increased stepwise as a result of the fact that the slip is detected, in order to converge the slip.

The learned value is calculated on the basis of the limit clamping pressure detected at Step S509. The calculation of the learned value can be made as the aforementioned calculation on the basis of the lower limit clamping pressure. Also, a control to reflect the learned value on the clamping pressure control can be carried out as the aforementioned control to reflect the learned value on the basis of the lower limit clamping pressure on the clamping pressure control.

Here, in case the aforementioned Step S501 is NO, or in case the aforementioned Step S503 is NO, the current operating state is in the learned region, so that the limit clamping pressure reflection control is carried out (at Step S510) using the learned values of each operating region.

According to the control system of the invention for carrying out above-mentioned controls, the learning of the clamping pressure is carried out while changing the load factor or the output torque of the engine 2 to the load factor or the output torque in the unlearned region, and suppressing the change in the driving force resulting from the change in the operating state of the engine 2 by the motor generator 3. Therefore, the learned value in the unlearned region can be obtained by changing the operating region of the engine 2 without changing the running state of the vehicle. Especially, in the control examples shown in FIGS. 8 to 10, the learning is carried out by changing the torque inputted to the continuously variable transmission 1. Therefore, the estimated errors of the engine torque and the friction coefficient are reflected on the learned value to be obtained. According to the clamping pressure control making use of the learned value, therefore, it is possible to set the clamping pressure in which the estimated errors of the input torque and the friction coefficient are corrected. This optimizes the clamping pressure more properly. Moreover, in case the operating state is in the unlearned region, the clamping pressure can be optimized using the learned value. As a result, learning can be carried out in a wide range without waiting the change in the operating state of the vehicle.

Here will be briefly described the relations between the aforementioned specific examples and this invention. The means for carrying out Steps S204 and S601 corresponds to an operating state changing means and a torque change suppressing means of the invention, the means for carrying out Steps S205 and S509 corresponds to a clamping pressure learning means of the invention, the means for carrying out Step S207 corresponds to a means for changing the operation state to the frequently-used operating state of the invention, the means for carrying out Step S208 corresponds to a means for inhibiting the learning of the less frequently-used operating state of the invention, and the means for carrying out Step S602 corresponds to a speed change ratio control means of the invention.

Here, this invention should not be limited to the specific examples thus far described. The means for suppressing the change in the input torque or the driving force in the continuously variable transmission resulting from the change in the operating state of the engine may be an appropriate means other than the aforementioned motor generator. For example, a means for changing a load of auxiliaries driven by the engine, a means for changing a braking force of a brake of the vehicle or the like may also be used. Accordingly, the vehicle to which the invention is applied should not be limited to a hybrid vehicle. The invention may also be applied to an ordinary vehicle having one kind of a prime mover such as an internal combustion engine or a motor. Also, the invention may be applied not only to the belt-type continuously variable transmission but also to a toroidal type continuously variable transmission.

What is claimed is:

1. A control system for a continuously variable transmission of a vehicle, in which a clamping pressure of rotary members to clamp a transmission member is learned and set in every operating state of a prime mover connected to an input side of the continuously variable transmission having the rotary members and the transmission member, comprising:

an operating state changing means for changing an operating state of the prime mover in response to a satisfaction of learning execution condition of the clamping pressure;

a torque change suppressing means for suppressing a change in a torque resulting from the change in the operating state of the prime mover; and a clamping pressure learning means for learning the clamping pressure in the operating state of the prime mover after the change, while the operating state of the prime mover is being changed and the change in the torque resulting from the change in the operating state of the prime mover is being suppressed by the torque change suppressing means.

2. The control system according to claim 1,
wherein the torque change suppressing means includes a means for suppressing the change in the torque inputted from the prime mover to the continuously variable transmission when the operating state of the prime mover is changed.

3. The control system according to claim 1,
wherein the prime mover includes an internal combustion engine; and
wherein the torque change suppressing means includes at least one of:
a motor generator driven by the internal combustion engine or applies the torque to the torque outputted from the internal combustion engine, and
an auxiliary machine connected to the internal combustion engine.

4. The control system according to claim 3, further comprising:
a planetary gear mechanism having three rotary elements capable of rotating differentially each other; and
wherein the internal combustion engine is connected to a first rotary element, the motor generator is connected to a second rotary element, and the continuously variable transmission is connected to a third rotary element.

5. The control system according to claim 4,
wherein the planetary gear mechanism includes a double pinion type planetary gear mechanism, which comprises:
the sun gear as the first rotary element;
a ring gear arranged concentrically with a sun gear as the third rotary element;
a carrier as the second rotary element, which holds a first pinion meshing with the sun gear, and a second pinion meshing with the first pinion and the ring gear, in a rotatable and revolvable manner.

6. The control system according to claim 5, further comprising:
a clutch mechanism for selectively connecting the carrier and the ring gear with the continuously variable transmission; and
a brake for fixing the ring gear selectively.

7. The control system according to claim 1,
wherein the torque change suppressing means includes a means for suppressing a change in the drive torque of the vehicle when the operating state of the prime mover is changed.

8. The control system according to claim 7,
wherein the torque change suppressing means includes at least one of:
an another prime mover connected to a wheel other than the wheel to which the torque is transmitted from the prime mover through the continuously variable transmission, and
a brake for braking any of said wheels.

9. The control system according to claim 8,
wherein said another prime mover includes a motor generator which is controlled into a power mode or a regenerative mode.

10. The control system according to claim 1,
wherein the operating state changing means includes a means for changing the operating state of the prime mover by selecting a frequently-used operating state.

11. The control system according to claim 1,
wherein the clamping pressure learning means includes a means for learning the clamping pressure in response to a change in the behavior of the continuously variable transmission resulting from lowering the clamping pressure, and for inhibiting the learning in a less frequently-used operating state.

12. The control system according to claim 1, further comprising:
a speed change ratio control means for controlling a speed change ratio of the continuously variable transmission to suppress a change in the speed of the prime mover, when the operating state of the prime mover is changed and the change in the torque is suppressed by the torque change suppressing means.

13. The control system according to claim 1, further comprising:
a clamping pressure lowering means for lowering the clamping pressure to a lower limit at which a slip of the transmission member does not occur, under the condition that the operating state of the prime mover is changed by the operating state changing means, and that the change in the torque resulting from the change in the operating state of the prime mover is being suppressed by the torque change suppressing means, and
wherein the clamping pressure learning means comprises:
a calculation means for finding an output torque of the prime mover in the operating state after the change, on the basis of the lower limit pressure and the torque outputted or absorbed by the torque change suppressing means;
an estimation means for estimating the output torque of the prime mover on the basis of the operating state after the change; and
a learned value calculation means for finding a proportion or a difference between an output torque obtained by the calculation means and an estimated output torque estimated by the estimation means as a learned value.

14. The control system according to claim 13, further comprising:
a running state detecting means for detecting a running state, in which the slip of the transmission member does not occur even when a hydraulic pressure for setting the clamping pressure is lowered to a lower limit in a controllable range; and
wherein the clamping pressure lowering means includes a means for lowering the clamping pressure in case said running state is detected by the running state detecting means.

15. The control system according to claim 13,
wherein the clamping pressure lowering means includes a means for lowering the clamping pressure to the pressure just before the transmission member starts slipping, and for setting the pressure just before the occurrence of the slip as a lower limit pressure.

16. The control system according to claim 1,
wherein the operating state changing means includes a means for changing the operating state of the prime mover into the state where the learning has not been completed yet.

17. A control system for a continuously variable transmission of a vehicle, in which a clamping pressure of rotary members to clamp a transmission member is learned and set in every operating state of a prime mover connected to an input side of the continuously variable transmission having those rotary members and transmission member, comprising:
an operating state changing mechanism for changing an operating state of the prime mover in response to a satisfaction of learning execution condition of the clamping pressure;
a torque change suppressing mechanism for suppressing a change in a torque resulting from a change in the operating state of the prime mover; and
a clamping pressure learning device for learning the clamping pressure in the operating state of the prime mover after the change, while the operating state of the prime mover is being changed and the change in the torque resulting from the change in the operating state of the prime mover is being suppressed by the torque change suppressing means.

18. The control system according to claim 17, further comprising:
a clamping pressure lowering mechanism for lowering the clamping pressure to a lower limit at which a slip of the transmission member does not occur, under the condition that the operating state of the prime mover is changed by the operating state changing mechanism, and that the change in the torque resulting from the change in the operating state of the prime mover is being suppressed by the torque change suppressing mechanism, and
wherein the clamping pressure learning device comprises:
a calculator for finding an output torque of the prime mover in the operating state after the change, on the basis of the lower limit pressure and the torque outputted or absorbed by the torque change suppressing mechanism;
an estimator device for estimating the output torque of the prime mover on the basis of the operating state after the change; and
a learned value calculator for finding a proportion or a difference between an output torque obtained by the calculator and an estimated output torque estimated by the estimator device as a learned value.

19. A control method for a continuously variable transmission of a vehicle, in which a clamping pressure of rotary members to clamp a transmission member is learned and set in every operating state of a prime mover connected to an input side of the continuously variable transmission having those rotary members and transmission member, comprising:
a step of changing an operating state of the prime mover in response to a satisfaction of learning execution condition of the clamping pressure;
a step of suppressing the change in the torque resulting from the change in the operating state of the prime mover; and
a step of learning the clamping pressure in the operating state of the prime mover after the change, while the operating state of the prime mover is being changed and the change in the torque resulting from the change in the operating state of the prime mover is being suppressed by the torque change suppressing means.

* * * * *